United States Patent [19]

Miller

[11] Patent Number: 4,800,991

[45] Date of Patent: Jan. 31, 1989

[54] BRAKE MAINTENANCE MONITOR

[76] Inventor: Nicholas A. Miller, 7182 County Rd., 11A, Auburn, Ind. 46706

[21] Appl. No.: 86,968

[22] Filed: Aug. 19, 1987

Related U.S. Application Data

[63] Continuation-in-part of Ser. No. 767,094, Aug. 19, 1985, abandoned.

[51] Int. Cl.$^4$ .................... F16D 66/02; G01D 21/00; G01D 11/00; B60Q 1/00
[52] U.S. Cl. .................... 188/1.11; 116/208; 116/285; 340/52 B
[58] Field of Search .................... 188/1.11, 151 A; 192/30 W; 116/208, 284, 285, 173; 73/709; 340/52 A, 52 B

[56] References Cited

U.S. PATENT DOCUMENTS

| | | | |
|---|---|---|---|
| 1,391,895 | 9/1921 | Haskell | 116/285 |
| 3,298,466 | 1/1967 | Ayers, Jr. et al. | 116/208 X |
| 3,691,982 | 9/1972 | Hawthorne | 303/86 X |
| 4,279,214 | 7/1981 | Thorn | 116/208 |
| 4,583,071 | 4/1986 | Sebalds et al. | 188/1.11 |

OTHER PUBLICATIONS

Radlinski, R. W., "The Importance of Maintaining Air Brake Adjustment", in S.A.E. Tech. Paper Series 821263, Nov. 1982.
Jones, I. S., "Truck Air Brakes—Current Standards and Performance", in Conference of the Amer. Ass. for Automotive Medicine, Oct. 1984.

*Primary Examiner*—Andres Kashnikow
*Assistant Examiner*—Robert J. Oberleitner
*Attorney, Agent, or Firm*—Roger M. Rickert

[57] ABSTRACT

Method and apparatus for ensuring periodic adjustment of vehicle braking systems to maintain brake mechanism motion within prescribed bounds are disclosed and include an arrangement for monitoring motion of a selected brake mechanism component each time the vehicle brakes are applied and triggering a visible indicator only when the application of the vehicle brakes results in movement of the monitored component beyond a predetermined distance. Once triggered, the indicator remains triggered or "on" until manually reset.

18 Claims, 5 Drawing Sheets

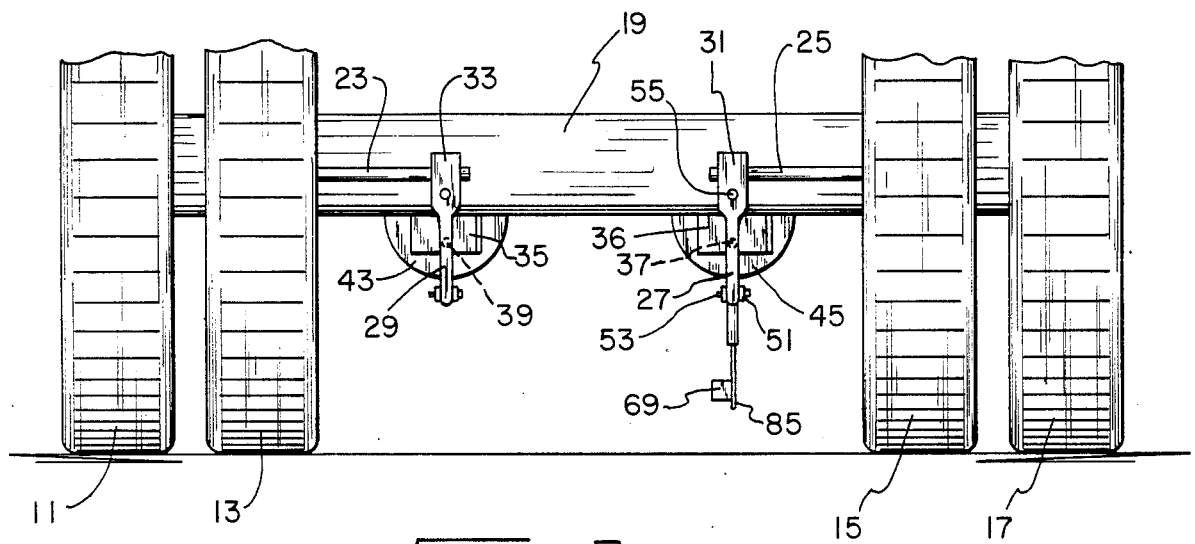
FIG. 7
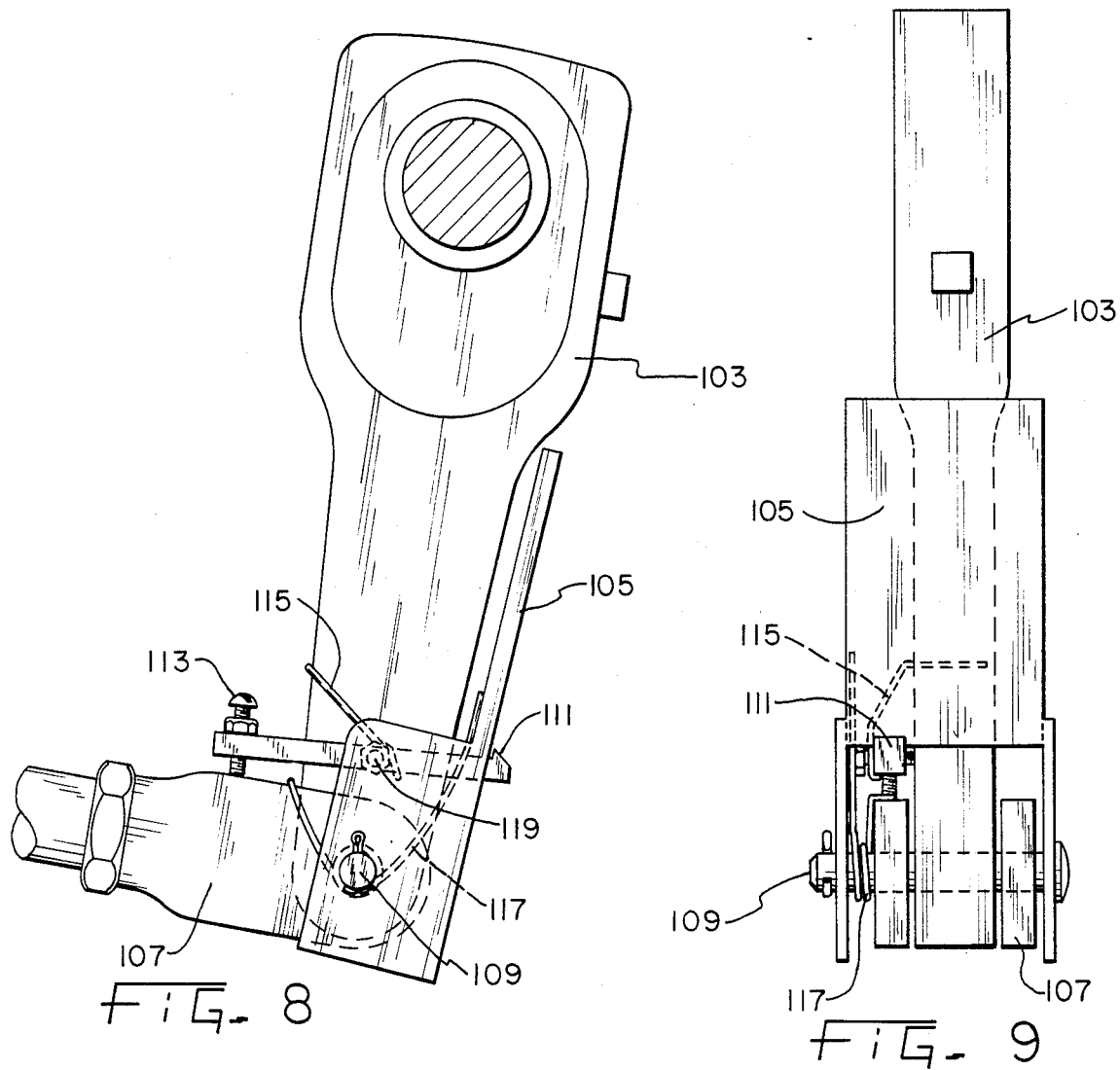
FIG. 8
FIG. 9

BRAKE MAINTENANCE MONITOR

CROSS-REFERENCE TO RELATED APPLICATION

This application is a continuation-in-part of my co-pending U.S. application Ser. No. 767,094 filed Aug. 19, 1985 and now abandoned.

SUMMARY OF THE INVENTION

The present invention relates generally to a method and apparatus for maintaining a vehicle air brake mechanism motion within prescribed limits and more particularly to an arrangement for automatically notifying personnel and observers in the event that brake mechanism motion exceeds the prescribed limits.

Virtually all braking systems experience wear during use with that wear in turn causing a certain amount of free play or motion in the brake mechanism which produces no effective braking action. This free play diminishes effective braking and thus some form of periodic manual or automatic adjustment of the brake mechanism is required to keep the brakes operating at or near peak efficiency.

Automatic brake mechanism adjusting schemes have been devices and are frequently found on conventional passenger car hydraulic brake system.

Hydraulic brake systems which lack such automatic adjustment features still provide the driver with a fairly good indication that brake adjustment is required in the form of excessive brake pedal travel.

Hydraulic braking systems, even of the power assist variety, are not adequate on larger vehicles such as buses and large trucks or trucks of the tractor-trailer variety. Such larger vehicles commonly employ air brakes where brake pedal actuation controls a valve releasing compressed air from a storage tank to a brake actuating chamber. With such air brake systems, pedal travel is no longer a reliable indicator of the need for brake mechanism adjustment since the braking fluid (air) is compressible. Automatic brake mechanism adjusting schemes are available for larger vehicle air brake systems, but failure of these mechanisms can occur resulting in the same conditions described above, i.e., pedal feels okay, but braking action is greatly impeded by maladjustment. The problem is compounded by dependence on the automatic device.

Further insight into the nature and severity of this problem may be found in the article entitled "The Importance of Maintaining Air Brake Adjustment" by Radlinski, Williams and Machey, published as a Society of Automotive Engineers Technical Paper Series in 1982. Briefly, this paper points out that something on the order of 15% of the air braked vehicles on the road are in an unsafe condition due to brake misadjustment. A 25% increase in effective stopping distance is the unsafe criteria for this estimate. The article further points out thirty-six recorded fatalities in the period 1973 to 1979 caused by truck air brakes being out of adjustment. This article concludes with a number of suggestions to improve the brake adjustment situation including "development and use of a system that would allow brake adjustment to be more easily checked (preferably with a one man operation). This would be desirable even with automatic adjusters to easily allow their operation to be checked. Manufacture of brake chambers with index marks on their pushrods would appear to be a step in the right direction."

A brake wear indicator somewhat along the lines suggested in the conclusion of the above article is disclosed in the Ayers et al U.S. Pat. No. 3,298,466 wherein an indicator rod extends from an air brake diaphragm chamber with one end of that rod fixed to and movable with the chamber diaphragm. Thus, with two workmen cooperating, it is possible to measure the extent of travel of the indicator rod when the brakes are applied and therefore determine if brake mechanism adjustment is required. The checking with this patented arrangement for excessive slack in the brake system is relatively time consuming and is effective only if maintenance and, in particular, slack measurements are performed with adequate frequency.

In a different area, brake malfunction indicators have been proposed, for example, as illustrated in the Hawthorne, U.S. Pat. No, 3,691,982. Hawthorne provides a flag on each railway car which can be read by automatic car number scanning equipment to produce an indication in conjunction with the car number when improper brake operation has occurred. The Hawthorne arrangement is employed is a railway environment where Westinghouse type braking systems, that is, systems which automatically apply the brakes when air pressure in a train line drops, and the Hawthorne flag is actuated upon malfunction in the braking system of either too little or too much travel of the brake cylinder. Hawthorne's concern is with malfunction rather than misadjustment and provides but a single signal for the entire set of brakes on a given railway car.

In still a different area, a somewhat conventional passenger car hydraulic brake arrangement having independent front and rear hydraulic systems is disclosed in U.S. Pat. No, 4,316,529 to Yanagawa et al. This patent discloses an arrangement for sensing excessive piston stroke in a conventional passenger car brake system of the type having a booster. THe primary thrust of this patented arrangement is to compensate for pressure differences between casual and panic stops. Thus, this patented arrangement responds to a combination of the stroke of piston rod 19 and foot pedal pressure, operating in a sort of pressure differential mode. The system is not responsive solely to excess actuating rod translation. If one front set of brake shoes is brand new and the other front wheel has a set of shoes which are completely worn out, the system will "average" these and indicate the front shoes are about half worn out. Thus, one brake mechanism associated with the worn set of brake shoes would experience excessive travel, but the system would not so indicate. It would be highly desirable to have a brake monitoring ysstem which is adapted to the monitoring of individual brake mechanisms on individual wheels.

In view of the foregoing and, in particular, the shocking statistics in the Radlinski, Williams and Machey article, there is a major need for improvement in detecting brake misadjustment.

Among the several objects of the present invention may be noted the provision of a warning flag providing a visible indication of excessive brake mechanism motion and the probable need for brake maintenance; the provision of an arrangement which monitors brake mechanism motion and provides a continuous warning after the monitored motion exceeds a predetermined limit once; the provision of a vehicle maintenance technique which maintains the brake mechanism motion within prescribed limits; the provision of a brake misadjustment indicator which is applicable to either drum or disc type brakes of the wedge or cam actuated variety, either with or without automatic slack adjusting features; and an overall improvement in highway safety by more closely monitoring the degree to which braking systems are maintained in proper adjustment. These as well as other objects and advantageous features of the present invention will be in part apparent and in part pointed out hereinafter.

In general a vehicle braking system having a plurality of pneumatic actuators is provided with a like plurality of indicators which respond solely to excess actuator motion when the vehicle brakes are applied to provide a visible indication of such excess motion and the probable need for brake adjustment.

Also in general and in one form of the invention, motion of a brake mechanism component is monitored and a warning indication triggered when that monitored motion exceeds a predetermined limit.

Still further in general, and in one form of the invention, a method of maintaining vehicle brake mechanism motion within prescribed limits includes the monitoring of the distance moved by a selected brake mechanism component when the vehicle brakes are applied and the triggering of an indicator only when application of the vehicle brakes results in movement of the selected component beyond a predetermined distance. Periodic scanning of the vehicle or a vehicle instrument panel for triggered indicators followed by manual adjustment of the brake mechanism and resetting of the indicator to an untriggered state returns the mechanism motion to within prescribed limits.

BRIEF DESCRIPTION OF THE DRAWING

FIG. 7 is a rear view of the lower portion of a truck trailer wherein the right wheel brake mechanism indicator has been triggered indicating brake misadjustment while the left wheel mechanism remains within proper adjustment limits;

FIG. 8 is a view of an actuaitng rod yoke and slack adjuster similar to those of FIGS. 1 and 4, but illustrating a still further modified form of the invention;

FIG. 9 is a view of the modification of FIG. 8 from the right side thereof;

Corresponding reference characters indicate corresponding parts throughout the several views of the drawing.

The exemplifications set our herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
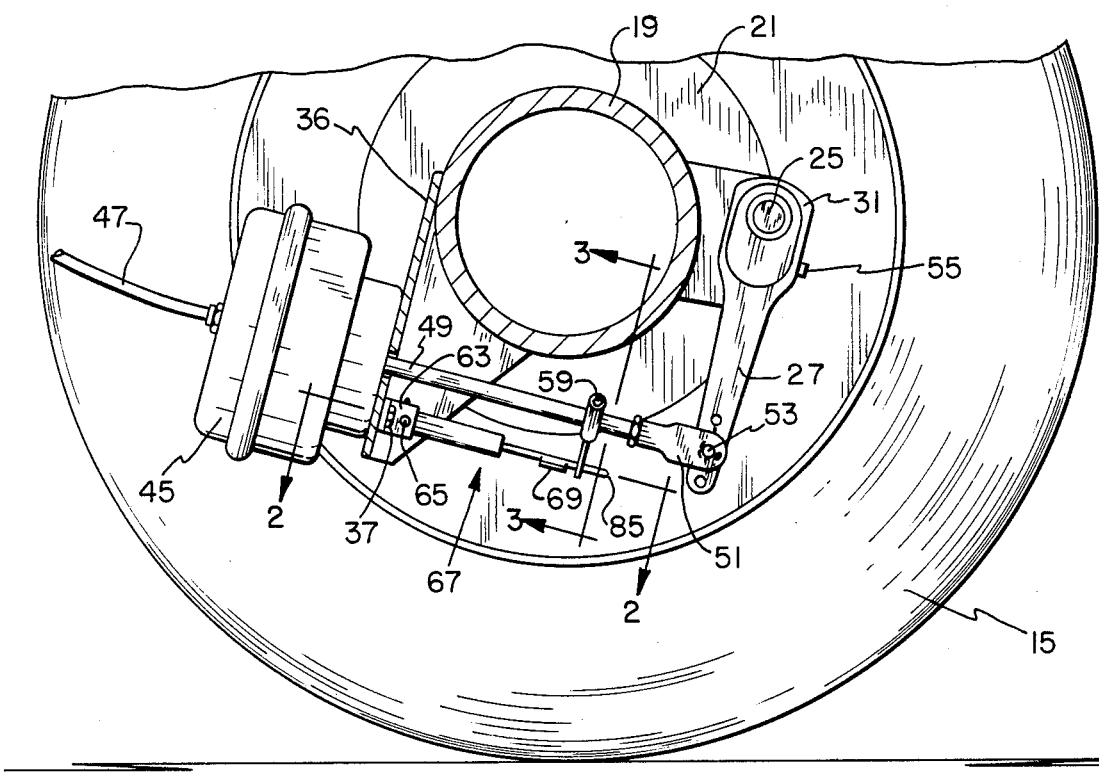
FIG. 1 is a side elevation view partly in cross-section illustrating one brake actuating mechanism incorporating a brake misadjustment indicator in one form of the invention.
Figure 4:
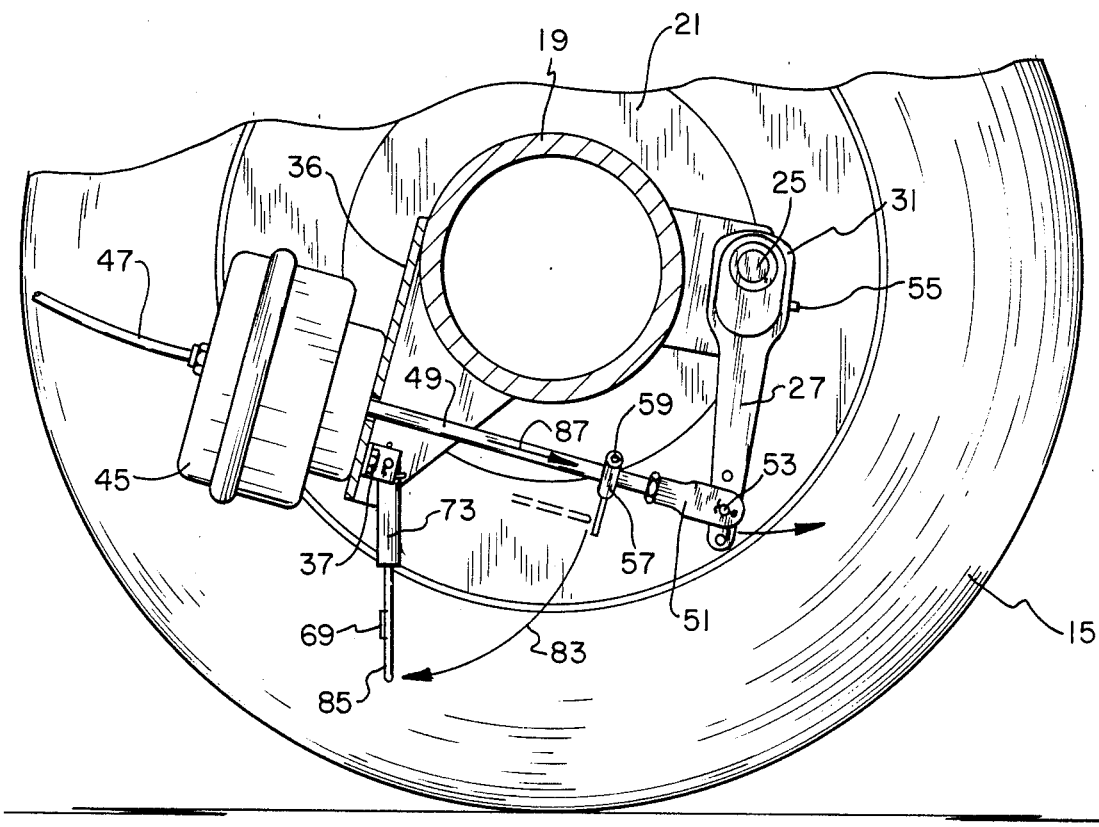
FIG. 4 is a view similar to FIG. 1, but illustrating the results of excess brake mechanism travel.

Referring first to FIGS. 1, 4 and 7, a preferred form of the present invention is illustrated in the environment of a truck and/or trailer air brake system of the common S-cam variety, but is equally applicable to any other vehicle air brake system. The environmental and conventional components of such a system include dual tire wheels, one wheel comprising the tires 11 and 13, and the other wheel comprising the tires 15 and 17 all coupled to and supporting a load bearing axle 19. A pair of cam actuated drum brakes, one for each wheel or pair of tires, are located annularly within the tires 13 and 15 with one drum being illustrated at 21 in FIGS. 1 and 4. Of course, the invention could equally well be applied to each brake group associated with a single tire on the front end of a tractor, to pairs of rear tractor tires, or to other types of air-braked vehicles. Thus, each wheel, whether it comprises one or, as illustrated, two tires, has an individual brake actuator and related mechanism associated therewith. This actuator and related mechanism is, as noted earlier, sometimes referred to as a brake group. The brake shoes are expanded or applied by rotation of rods 23 and 25 about their respective axes as induced by a turning motion of the arm 27 or 29 of respective slack adjusters 31 and 33. Brackets such as 35 and 36 are fastened as by welding to the axle 19 and in turn support, as by bolts 39 and 37, a pair of air actuated chambers 43 and 45, for example, of the clamp ring type. Typically, two such bolts are used to mount each chamber, but only one is illustrated in the drawings to avoid obscuring the invention with too much conventional structure.

Brake application is initiated by depression of the brake pedal by the driver in the vehicle which supplies air at high pressure to numerous lines including line 47. This air enters diaphragm chamber 45 forcing the diaphragm therein to move extending actuating rod 49 which, by way of the clevis or yoke 51 and pivot pin 53, causes slack adjuster arm 27 to rotate counterclockwise as indicated by the arrow in FIG. 4. This rotation and correlative rotation of rod 25 turns a cam mechanism applying the brakes. When the brake pedal is released, removing the air pressure from line 47, a return spring within diaphragm chamber 45 and the brake shoe return springs cause pushrod 49 to retract into the chamber 45 imparting a clockwise motion to slack adjuster arm 27 and releasing the brakes. The brake pedal acts as a pressure regulator in supplying air to actuate the brakes, hence, the "feel" of the pedal is not a good indication of the braking action.

Repeated brake application and the corresponding wear eventually results in excessive counterclockwise rotation of the slack adjuster arm 27 and reduced braking effectiveness. Normal maintenance then requires the screw-like slack adjuster head 55 to be manually turned which, by way of an internal worm gear arrangement in the slack adjuster 31, changes the angular relationship between the slack adjuster arm 27 and rod 25 so as to compensate for the wear putting the brake system back into proper adjustment. Knowing when such manual adjustment is called for and the specific wheel, i.e., the particular adjuster, requiring such adjustment is a salient goal of the present invention.

Figure 2:
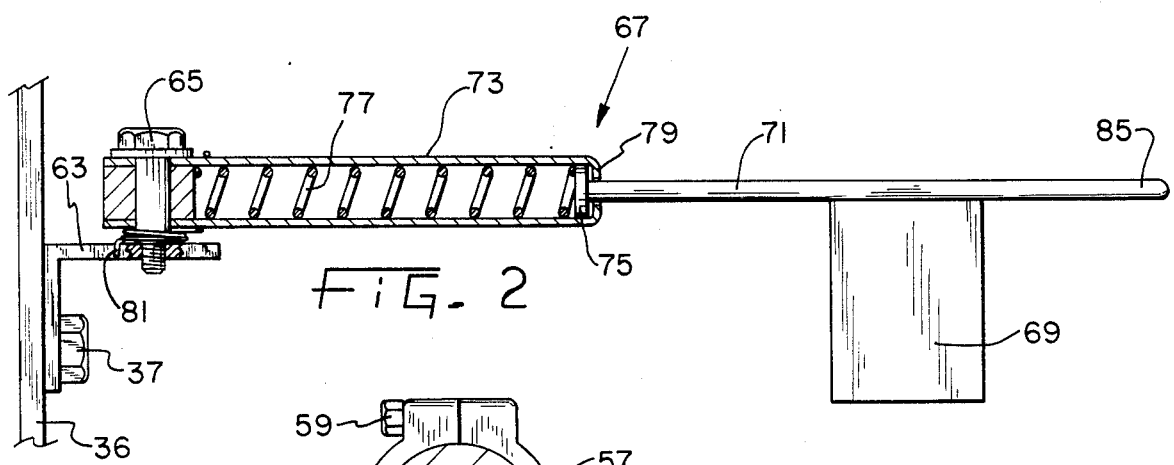
FIG. 2 is a cross-sectional view along the lines 2—2 of FIG. 1.
Figure 3:
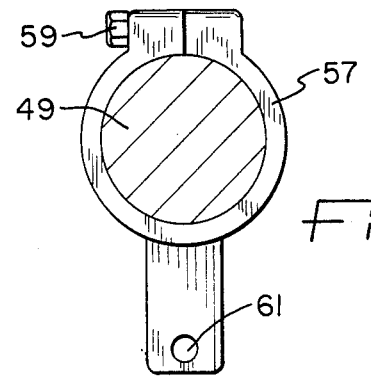
FIG. 3 is a cross-sectional view along the lines 3—3 of FIG. 1 showing the indicator triggering mechanism.

The actuating rod or pushrod 49 carries with it during its axial translation a collar 56 which is relatively permanently affixed thereto by a clamping bolt 59, as best seen in FIG. 3. A cradle arrangement in the form of hole 61 thus moves with rod 49 during the application or release of the brakes. One of the diaphragm chamber mounting bolts 37 also fastens an L-shaped bracket 63 to the plate 36 and this L-shaped bracket in turn supports, on pivot bolt 65, a flag arrangement indicated generally at 67 in FIG. 2.

In FIG. 2, the flag arrangement 67 includes a highly visible portion 69 of, for example, a red or vivid orange plastic or painted metallic sheet construction, or any reflective coating which is easily picked up by ambient or artificial light. The indicator flag 69 is in turn supported on the inner arm 71 of the spring biased telescoping arm pair 71, 73. Arm portion 71 includes an upset head or plunger 75 which is movable against the biasing of coil spring 77 allowing arm portion 71 to, as viewed in FIG. 2, be pushed leftwardly against the bias of coil spring 77. Plunger 75 is held captive within arm portion 73 by crimping the end thereof at 79. The flag assembly 67 also includes a biasing spring 81 which urges the flag to pivot about bolt 65 in the direction indicated by arrow 83 in FIG. 4. Thus, the two springs tend to urge the arm portion 71 to extend out of arm portion 73 and to urge the entire flag assembly 67 to pivot about the bolt 65 into the extended position illustrated in FIG. 4.

Tip 85 normally slides back and forth in hole 61, as illustrated in FIGS. 1, 2 and 3, as the brakes are applied and released. In the misadjustment situation, the collar 57 moves as indicated by the arrow 87 in FIG. 4 too far toward the right and tip 85 slips out of hole 61 allowing the flag member 67 to drop along the path illustrated by arrow 83. The flag member remains in the dropped or extended position until manually reset by twisting it about the pivot bolt 65 and compressing spring 77 somewhat so that the tip member 85 may be reinserted into the hole 61. Thus, once triggered, the flag remains extended warning observers of the misadjustment condition until it is manually reset. If the flag is reset without corrective adjustment, the next time the brakes are applied, the excessive wear condition will again cuase it to be triggered and deployed.

Figure 5:
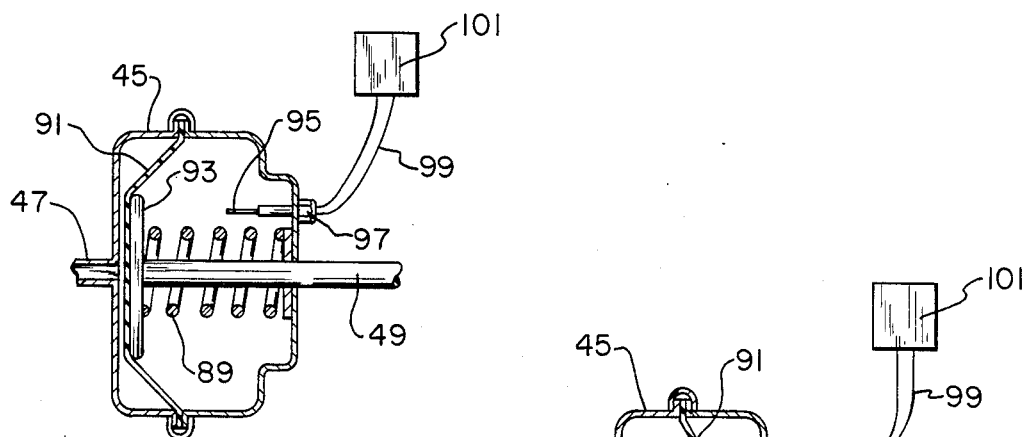
FIG. 5 is a cross-sectional view of an air actuated chamber of the same type as illustrated in FIGS. 1 and 4, but illustrating a modified form of the invention.
Figure 6:
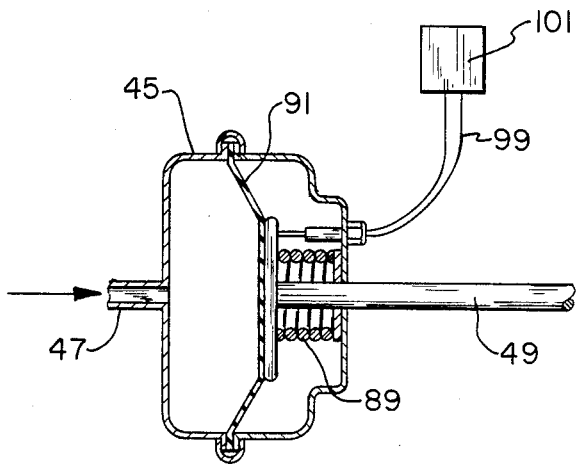
FIG. 6 is a view similar to FIG. 5, but showing the chamber diaphragm in a brake misadjusted braking position.
Figure 16:
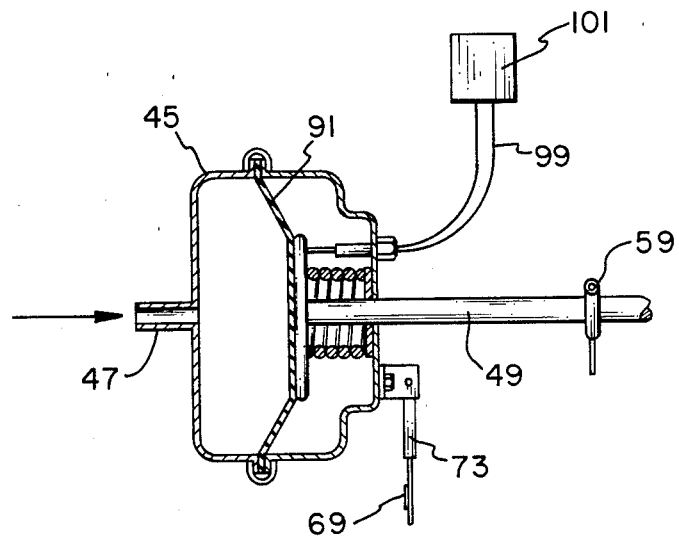
FIG. 16 is a view of the combination mechanical and electrical warning indicators.

FIGS. 5 and 6 illustrate one alternative arrangement for accomplishing the salutary goals of the present invention. This arrangement of FIGS. 5 and 6 and that earlier discussed or that of FIGS. 8 and 9 may be combined, as in FIG. 16, to provide both mechanical and remote electrical warning indications if desired. In FIGS. 5 and 6, only the air actuated diaphragm chamber of the previously discussed braking system is illustrated. That chamber 45 includes a return spring 89 and air actuated diaphragm 91. In space saving feature frequently employed is the make the spring 89 conical, rather than cylindrical as illustrated so that successive turns nest within the prior turns when the spring is compressed. When high pressure air is applied to the inlet 47, diaphragm 91 flexes from the position illustrated in FIG. 5 toward that illustrated in FIG. 6 extending actuating rod 49 to actuate or apply the brakes as heretofore discussed. If excessive slack is present in the brake system, rod 49 extends sufficiently far toward the right for plate 93 to engage the spring biased plunger 95 which functions as a switch actuating arm for the chamber mounted switch 97. Thus, arm 95 and switch 97 are arranged as a probe extending into the chamber 45 for detecting excessive diaphragm motion. Depression of the spring biased plunger 95 by this excessive diaphragm motion trips the switch which is in turn connected by wiring 99 to a display device 101. In its simplest form, display device 101 is simply a light bulb which is energized upon closure of the contacts in switch 97. This simplistic approach is not, however, preferred, since the driver may well not be watching the area of the dash where the lamp is located at the time the brakes are applied and when the brakes are released, the lamp would extinguish. These contacts could be set to trigger prior to the upper limit of brake linkage motion and either one display for the entire set of brakes or individual displays for individual sensors could be employed. Unless used with another form of this invention, individual displays indicative of the particular wheel experiencing the excess motion are preferred. Latching circuitry should be used to keep the indicator on once the limit has been reached. Multiple stage switches to give an early warning and a later danger indication might also be employed. Switch indications could also be connected to vehicle monitoring devices, either on board or remote, and a wide variety of such implementations will be readily apparent. For example, the mechanical motion of the plunger 95 could be used to trigger a mechanical device and deploy a flag. As in the first described version, diaphragm migration of about 1¾ inches is considered maximum, however, this figure is, of course, a function of the particular type of diaphragm chamber being employed.

In the modification illustrated in FIGS. 8 and 9, angular motion between the actuating rod and the slack adjuster is monitored in a friction-free manner and, when that angular motion exceeds a prescribed limit, a trigger arrangement functions to extend a flag indicative of the need for brake maintenance. In particular, in FIGS. 8 and 9, slack adjuster 103 is analogous to the slack adjuster 27 of FIGS. 1 and 4 while yoke 107 is similarly analogous to the yoke 51 near one end of the actuating rod 49 in FIGS. 1 and 4. Yoke 107 and slack adjuster 103 are coupled by a pivot pin 109 similar to pivot pin 53 in FIGS. 1 and 4. The brakes are applied in FIG. 8 by rightward movement of the yoke 107 and correlative counterclockwise motion of slack adjuster 103 and corresponding relative angular movement between those two member about pivot pin 102. Should the relative angular motion about pin 109 become excessive indicative of possible brake maintenance requirements, yoke 107 engages the tip of adjustment screw 113 causing the trigger arm 111 to pivot clockwise as viewed in FIG. 8 about its own pivot pin 119 and against the biasing of spring 115. Such clockwise motion lowers the notched right hand end of trigger 111 until that notched end no longer holds a flag 105 in the position illustrated in FIGS. 8 and 9. thus when the notched end of trigger 111 clears the flag 105, bias spring 117 causes the flag 105 to pivot clockwise as viewed about the pivot pin 109 and into an extended position much the same as depicted by flag 69 in FIG. 7. Bias spring 117 engages an inner surface of the flag 105 as best seen in FIG. 9 while the opposite end of that spring 117 may be affixed to the yoke 107 or spring 117 may rest against the upper surface of yoke 107 as depicted in FIG. 8. The precise angular relationship between the yoke and slack adjuster at which such triggering occurs may be adjusted by the movement of screw 113. Dirt or moisture protective housings or enclosures for the brake adjustment warning system may also be incorporated if desired.

The modification of FIGS. 10-13 is somewhat analogous to that shown in FIGS. 1-4 and correspondingly primed reference numerals have been used where convenient to identify corresponding parts or parts having a corresponding function. In FIGS. 1-4, each time the brakes are applied there is relative motion and wear of the tip member 85 in hole 61. With long use, such wear could be detrimental to the device, and it would be desirable for some applications to have a friction-free implementation. The embodiment of FIGS. 8 and 9 monitored angular motion in a friction-free manner. The embodiment of FIGS. 10-13 monitors extension of the actuating rod 49' in a friction free manner.

Figure 10:
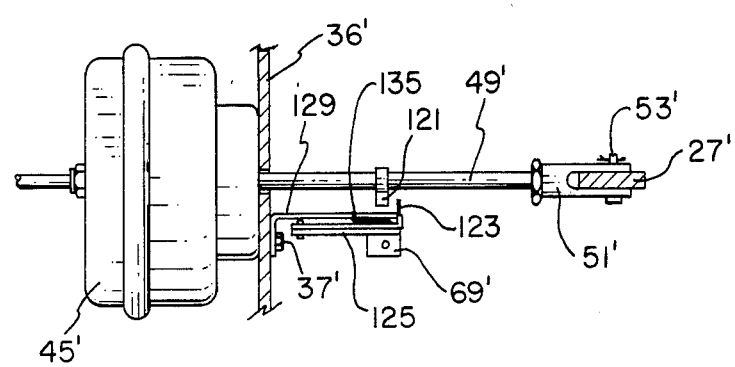
FIG. 10 is a bottom view of yet another modified form of the present invention.
Figure 12:
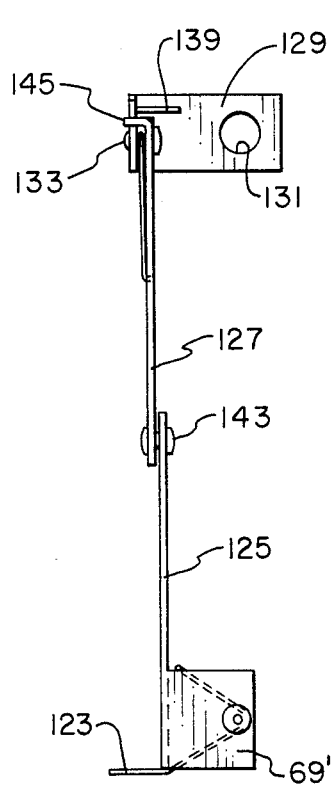
FIG. 12 is a view of the flag mechanism of FIGS. 10 and 11 in the extended configuration.
Figure 13:
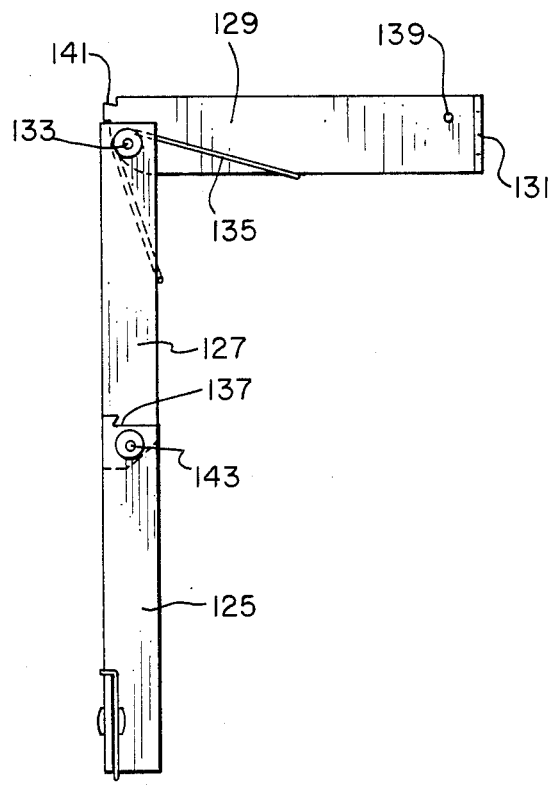
FIG. 13 is a view of the flag mechanism of FIG. 12 from the right side thereof.

In FIG. 10, a boss or protrusion 121 is fixed to and moves with the actuating rod 49'. When brake adjustment is called for, the rod 49' moves sufficiently far toward the right as viewed to engage and push the spring wire 123 rightwardly and trigger the mechanism to its extended position as shown in FIGS. 12 and 13. The flag mechanism comprises a pair of articulated or pivoted arms 125 and 127 and a fixed L-shaped arm or bracket 129 which is bolted to the chamber 45' and frame 36' by illustrative bolt 37' of the typical pair of bolts which normally fasten the chamber 45' to the vehicle frame. Bolt 37' of FIG. 10 is received in hole 131 of FIG. 12.

Referring primarily to FIG. 13, arm 127 is pivoted counterclockwise about pin 133 against the bias of spring 135 and into parallel alignment with arm 129. Arm 125 is then pivoted clockwise about pivot pin 143 to hook the notch 137 over pin 139. A slight additional clockwise pivoting of arm 125 allows spring wire portion 123 to be hooked over notch 141 and the mechanism is set ready to be triggered by excess excursion of arm 49'.

Figure 11:
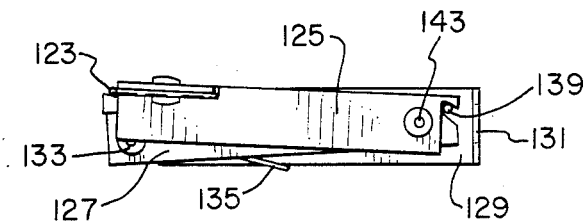
FIG. 11 is a view of the flag mechanism of the modification of FIG. 10 from the side thereof opposite the brake actuating rod.

When such excess excursion occurs, boss 121 pushes spring 123 off notch 141 and arm 125 begins to fall rotating counterclockwise about pin 143 as viewed in FIG. 11. When notch 137 clears pin 139, arm 127 under the urging of spring 135 rotates clockwise until stop member 145 engages the end of L-shaped bracket 129. In this position, the flag 69' is very low and easily seen as a warning that adjustment may be called for.

Figure 14:
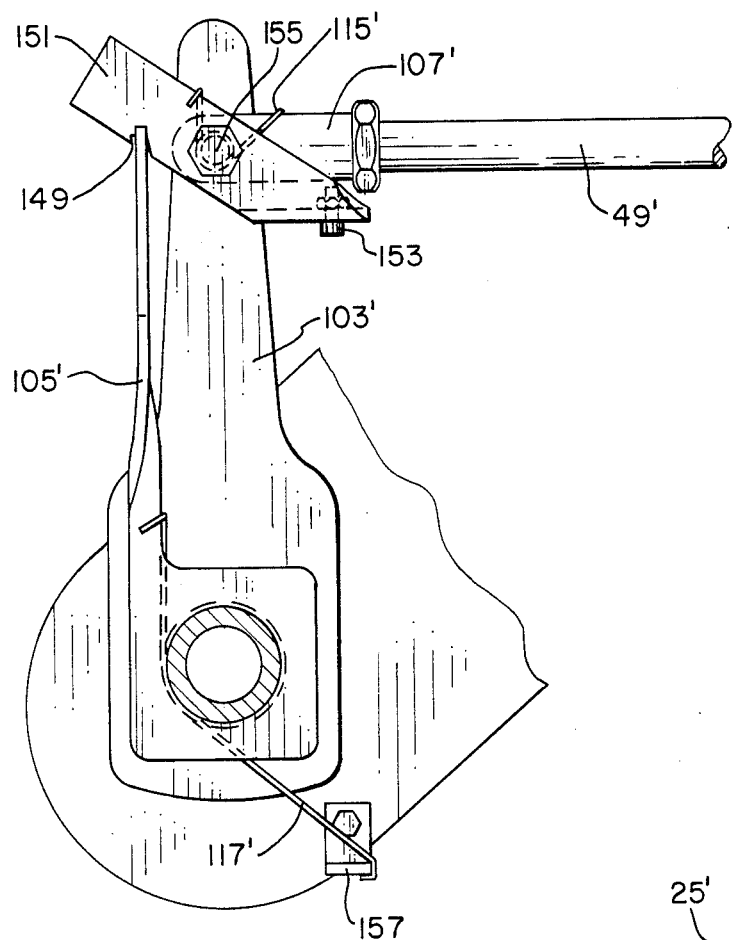
FIG. 14 illustrates still another modified form of the invention.
Figure 15:
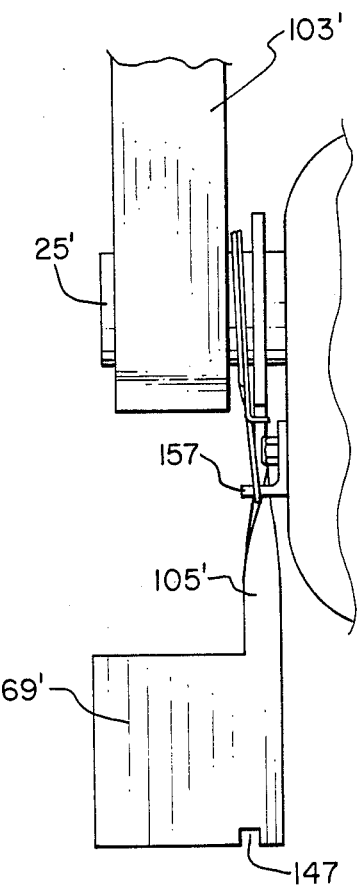
FIG. 15 is a view of the modification of FIG. 14 from the right side thereof, but with the flag extended.

The modification of FIGS. 14 and 15 is somewhat analogous to that shown in FIGS. 8 and 9 and correspondingly primed reference numerals have been used where convenient to identify corresponding parts or parts having a corresponding function. In FIGS. 8 and 9, the brake actuating mechanism was mounted beneath the axle as in the embodiment of FIGS. 1-4. In FIGS. 14 and 15, mounting is over top the axle. Thus, while flag member 105 pivoted under the urging of spring 117 towards an extended position clockwise about clevis pin 109 in FIG. 8, flag member 105' pivots counterclockwise about the shaft or rod 25' under the urging of spring 117' in FIGS. 14 and 15.

Flag 69' has a notch 147 which interengages with a notch 149 in trigger member 151. Under normal conditions, these notches are maintained together by the urging of spring 115'. When the brakes are applied under an adjustment needed situation, actuating rod 49' moves toward the left as viewed pivoting slack adjuster arm 103' counterclockwise until the end of adjustment screw 153 engages the yoke 107'. Additional (excess) motion causes trigger member 151 to pivot clockwise about bolt 155 against the urging of spring 115' until notches 147 and 149 separate fleeing flag 69' and arm 105' to pivot counterclockwise about one-half revolution until stopped in the extended position by the block 157.

In summary, the vehicle brake mechanism motion is maintained within prescribed limits by continuously monitoring the distance moved by a selected brake mechanism component such as the diaphragm 91, actuating rod 49 or pivotable arm 27, or by monitoring relative angular movement of a brake component as shown, for example, in FIGS. 8 and 9 or 14 and 15. An indicator is triggered when application of the vehicle brakes results in movement of the selected component beyond a predetermined limit. Such triggering occurs, for example, when collar 57 moves sufficiently far to free flag end 85 from hole 61, closing of the switch 97 and activation of latching circuitry upon excessive diaphragm migration, or the notched end of trigger 111 clearing the flag 105. In each of the mechanical embodiments disclosed herein, the triggering includes releasing a catch mechanism which normally holds an indicator in a retracted position and allowing the indicator to move to an extended position. The vehicle is scanned periodically for triggered indicators by, for example, drivers, maintenance personnel or others, simply looking underneath the vehicle and presented with a view somewhat like that illustrated in FIG. 7 or seeing a display on the instrument panel or exterior. In FIG. 7, the person would readily recognize that the right indicator or flag 69 is extended while that on the left is not and would conclude that manual adjustment of the right wheel brake mechanism to return the motion thereof to within the prescribed limits is called for. This would be accomplished by adjusting the worm gear controlled by head 55. Upon completion of the adjustment, the operator or maintenance person would pivot the flag assembly 67 opposite the direction indicated by arrow 83 in FIG. 4 and recradle the free end 85 by collapsing telescoping arm portion 71 into arm portion 73 allowing tip 85 to pass through hole 61 and again be slidingly supported thereby. Flag 69 as seen in FIG. 7 is sufficiently visible that, should the operator fail to note its extension, highway patrolmen or others might, thus adding further motivation to regular maintenance inspections. In automatic slack adjusting the present invention would reduce the potential of brake loss due to failure of the automatic adjust mechanism.

In light of the forgoing discussion, numerous modifications should now suggest themselves to those of ordinary skill in the art. For example, while a single diaphragm chamber has been illustrated, so-called spring brakes employing a double chamber for emergency or parking brake operations are equally suited to the techniques of the present invention. Arrangements for sensing or monitoring diaphragm motion and actuating rod motion have been discussed, however, it should be clear that any of the motion sensing techniques could be applied to other components at the individual wheels. For example, a switch and spring loaded switch actuating arm might be mounted near the arm 27 and the switch actuated by excessive rotation of that arm. Various other limit or reed switches could be employed in monitoring the distance moved by a selected brake mechanism component and multiple stage warning schemes could easily be implemented. Thus one might employ a series of flags which progressively indicated a caution situation when motion was approaching an excessive amount followed by a danger or out of adjustment indication when that motion exceeded some prescribed upper bound. Numerous spring loading and cable coupling schemes are also possible. The mechanically dropping flag arrangement has been illustraed in one embodiment as pivoted at a fixed location and cradled or supported by a movable member. However, this flag could equally well be pivoted on the movable member and cradled or supported by some fixed member. Electrically energized warning indicators may be visible to the driver as, for example, by instrument panel displays, or may be visible exterior of the vehicle or both. Either mechanical or electro-mechanical arrangements may be employed to monitor the movement of virtually and of the brake lingage components.

From the foregoing, it is now apparent that a novel brake system misadjustment warning indicator as well as a novel approach to the problem of vehicle brake maintenance has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In a vehicle braking system having a plurality of pneumatic diaphragm chamber actuators each having a diaphragm therein and each responsive to air supplied thereto for translating a corresponding actuating rod which in turn functions to apply certain of the vehicle brakes, each actuating rod extending from a corresponding chamber and coupled to the diaphragm thereof for movement therewith, each pneumatic actuator and each corresponding actuating rod applying the brakes of one wheel only of the vehicle, the improvement comprising a like plurality of indicators each responsive solely to excess motion of a brake component indicative of excess translation of a corresponding actuating rod when the vehicle brakes are applied to provide a visible indication of such excess translation and probable need for brake maintenance as well as an indication of the particular wheel where such maintenance is probably needed, each indicator comprising a flag pivotable between a retracted position and an extended position providing the visible indication, and each flag including an axially telescoping arm portion spring loaded to extend a free end thereof away from the pivot, the indicator continuing to provide the visible indication when the brakes are released after such excess translation.

2. The improvement of claim 1 wherein said flag includes means cooperating with the corresponding actuating rod for maintaining the flag in its retracted position only so long as actuating rod translation remains within prescribed limits.

3. The improvement of claim 2 wherein each indicator is pivotably attached to a relatively immovable frame portion of the vehicle and each cooperating means comprises a cradle fixed to and movable with the actuating rod, the cradle supporting the flag until excess translation moves the cradle away from the flag freeing the flag to move to the extended position.

4. The improvement of claim 1 wherein each flag is spring biased toward the extended position.

5. The improvement of claim 1 wherein each flag includes means cooperating with the corresponding actuating rod for maintaining the flag in its retracted position only so long as actuating rod translation remains within prescribed limits.

6. The improvement of claim 5 wherein each flag is pivotably attached to a relatively immovable frame portion of the vehicle and each cooperating means comprises a cradle fixed to and movable with the actuating rod, the cradle supporting the flag until excess translation moves the cradle away from the flag freeing the flag to move to the extended position.

7. The improvement of claim 6 wherein the flag may be manually reset from the extended to the retracted position by telescopically collapsing the arm portion against the spring loading sufficiently to pass the arm free end past the cradle.

8. The improvement of claim 1 wherein each pneumatic actuator is a diaphragm chamber, the brake component motion comprising diaphragm motion.

9. The improvement of claim 1 further comprising triggering mechanisms for holding respective flags in retracted positions and responsive to excess actuating rod translation to release the respective flag to the extended position.

10. In a vehicle braking system having an air actuated diaphragm chamber having a diaphragm therein, an elongated actuating rod connected to the diaphragm, and a pivotable arm coupled to the actuating rod and responsive to the actuating rod translation to apply and release a vehicle brake at a single wheel; the improvement comprising: means for monitoring motion of one of the diaphragm, actuating rod, and pivotable arm each time the vehicle brake is applied; and for triggering a warning indication when monitored motion exceeds a predetermined limit indicating the brakes of the single wheel require adjustment, the means for monitoring including a pivotable flag and an electrically activated display device both providing warning indications when the monitored motion exceeds a predetermined limit, the means for monitoring further includes a spring for biasing said pivotable flag toward the extended position, and a triggering mechanism for normally holding the flag in a retracted position and responsive to monitored motion in excess of the predetermined limit to release the flag, said means continuing to provide the warning indication when the brake is released after such motion exceeds said limit.

11. The improvement of claim 10 wherein the motion monitored is translation of the actuating rod, the means for monitoring comprising said pivotable flag held in a retracted position so long as actuating rod motion remains within the predetermined limit and released to move to an extended position when the motion exceeds the limit.

12. The improvement of claim 11 wherein the pivotable flag is pivotably attached to a relatively immovable frame portion of the vehicle, the means for monitoring further comprising a cradle fixed to and movable with the actuating rod, the cradle slidingly engaging the flag to maintain the flag in the retracted position and moving beyond the flag freeing the flag to pivot to the extended position when the motion exceeds the limit.

13. The improvement of claim 10 wherein the motion monitored is diaphragm motion, the means for monitoring comprised chamber mounted switch means, a switch actuating arm within the chamber extending from the switch means toward the diaphragm for actuating the switch means in response to diaphragm movement, said display device responsive to switch means actuation to provide a visible warning indication.

14. The improvement of claim 10 wherein the motion monitored is diaphragm motion.

15. A method of maintaining vehicle brake mechanism motion within prescribed limits comprising the steps of:

monitoring the motion of a selected mechanism component at a selected wheel in a friction-free manner each time the vehicle brakes are applied;

triggering an indicator for the selected wheel only when application of the vehicle brakes results in movement of the selected component beyond a predetermined limit;

periodically scanning a vehicle for triggered indicators;

manually adjusting the brake mechanism of the selected wheel returning the motion thereof to within the prescribed limits; and resetting the indicator to an untriggered state, the steps of monitoring and triggering being performed automatically by apparatus dedicated to the brake mechanism while the steps of periodically scanning, manually adjusting and resetting are performed manually.

16. The method of claim 15 wherein the step of monitoring includes slidingly supporting a pivotable arm during each application of the vehicle brakes, the triggering step being initiated when the selected component motion is sufficient to remove the sliding support from the arm.

17. The method of claim 15 wherein the step of monitoring includes positioning a switch near the selected component, the triggering step being initiated when the selected component motion is sufficient to actuate the switch.

18. The method of claim 15 wherein the step of triggering includes releasing a catch mechanism which normally holds an indicator in a retracted position and allowing the indicator to move to an extended position.

* * * * *